(12) United States Patent
Kanamitsu (10) Patent No.: US 10,059,543 B2
(45) Date of Patent: Aug. 28, 2018

(54) MEDIUM FEEDING DEVICE, IMAGE READING APPARATUS, AND RECORDING APPARATUS

(71) Applicant: SEIKO EPSON CORPORATION, Tokyo (JP)

(72) Inventor: Masatomo Kanamitsu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/295,413

(22) Filed: Oct. 17, 2016

(65) Prior Publication Data

US 2017/0107068 A1    Apr. 20, 2017

(30) Foreign Application Priority Data

Oct. 20, 2015    (JP) ................................. 2015-206369

(51) Int. Cl.

| | |
|---|---|
| *B65H 3/34* | (2006.01) |
| *B65H 3/56* | (2006.01) |
| *B65H 1/14* | (2006.01) |
| *B65H 3/06* | (2006.01) |
| *H04N 1/00* | (2006.01) |

(52) U.S. Cl.
CPC .................. *B65H 3/34* (2013.01); *B65H 1/14* (2013.01); *B65H 3/063* (2013.01); *B65H 3/56* (2013.01); *H04N 1/00588* (2013.01); *H04N 1/00602* (2013.01); *H04N 1/00628* (2013.01)

(58) Field of Classification Search
CPC ..................................... B65H 1/14; B65H 3/56

USPC .................................................. 271/121–124
See application file for complete search history.

(56) References Cited

U.S. PATENT DOCUMENTS

| | | | |
|---|---|---|---|
| 6,883,798 B2 * | 4/2005 | Hsieh ................... | B65H 3/0661 271/124 |
| 7,108,257 B2 * | 9/2006 | Shiohara .............. | B65H 3/0661 271/104 |
| 7,357,386 B2 * | 4/2008 | Shikan ..................... | B65H 1/24 271/10.09 |
| 7,410,161 B2 * | 8/2008 | Yamamoto ............. | B65H 3/063 271/113 |

(Continued)

FOREIGN PATENT DOCUMENTS

| | | |
|---|---|---|
| JP | 2001-341876 A | 12/2001 |
| JP | 2006-117384 A | 5/2006 |
| JP | 4820314 B | 9/2011 |

*Primary Examiner* — Patrick Cicchino
(74) *Attorney, Agent, or Firm* — Workman Nydegger (57) ABSTRACT

A medium feeding device including a medium mounting portion where media are mounted; a feeding roller that feeds the media from the medium mounting portion by contacting a bottommost sheet of the media mounted in the medium mounting portion, and rotating; a separator that separates a sheet of the media by nipping the sheet between the feeding roller and the separator; an abutting member that is provided above the feeding roller, is switchable between a closed posture that blocks a feeding path of the media upstream of the separator and an open posture that opens the feeding path, abuts against a leading edge of the media mounted in the medium mounting portion, and includes a friction surface at a position where the abutting member abuts against the leading edge; and a biasing member that biases the abutting member toward the closed posture.

15 Claims, 9 Drawing Sheets

(56) References Cited

U.S. PATENT DOCUMENTS

| | | | |
|---|---|---|---|
| 7,621,522 B2* | 11/2009 | Yasukawa | B65H 3/063 |
| | | | 271/114 |
| 8,876,108 B2* | 11/2014 | Uchida | G03G 15/6567 |
| | | | 271/226 |
| 9,637,333 B2* | 5/2017 | Kuriki | B65H 3/063 |
| 2002/0011702 A1 | 1/2002 | Otsuka et al. | |
| 2005/0017433 A1* | 1/2005 | Otsuki | B65H 3/0661 |
| | | | 271/121 |
| 2008/0143045 A1* | 6/2008 | Yu | B65H 9/004 |
| | | | 271/245 |
| 2008/0203652 A1 | 8/2008 | Yasuhawa et al. | |

\* cited by examiner

MEDIUM FEEDING DEVICE, IMAGE READING APPARATUS, AND RECORDING APPARATUS

BACKGROUND

1. Technical Field

The present invention relates to a medium feeding device that feeds a medium, and an image reading apparatus and recording apparatus including the medium feeding device.

2. Related Art

An example of an image reading apparatus, namely a scanner, is given below. In some cases, a scanner is provided with a feeding device (also referred to as an auto document feeder (ADF)) that automatically feeds a document, which is an example of a medium, and is configured to be capable of automatically feeding and reading a plurality of documents.

Japanese Patent No. 4820314 describes a feeding device with such a configuration including a tray ("shooter 14" in Japanese Patent No. 4820314) in which a plurality of documents is mounted, a feeding roller ("setting roller 2" in Japanese Patent No. 4820314) that feeds the documents by contacting the surface of the documents set in the tray and rotating, and a separating roller ("setting roller 12" in Japanese Patent No. 4820314) that contacts the feeding roller and separates the documents.

The feeding roller described in Japanese Patent No. 4820314 is configured to sequentially feed documents from a sheet on a bottom side, that is, a sheet on the mounting surface side of the tray, of the plurality of documents (paper stack) stacked in the tray. A leading edge of upper sheets, that is, sheets to be separated, abut onto the separating roller and are restricted from being transported downstream.

While various systems for separating sheets exist, in some cases separation performance may be insufficient with only the separation obtained through a separator (main separator) such as those described above; and in some cases, to perform more reliable separation, a section for performing preliminary separation (sub separator) may be provided upstream of the separator. In recording apparatuses such as printers, as described in JP-A-2006-117384, for example, in some cases such configurations are employed that a ramp (bank separation portion) for separating sheets is provided at a location facing the paper leading edge in the feeding tray, and the number of sheets advancing to the main separator is reduced by this separation-use ramp.

While bank separating systems such as that described above have simple structures and can be manufactured at low cost, there is a disadvantage in that the bank separating systems may not be applied as-is to the feeding device of such a type that described in Japanese Patent No. 4820314, in which sheets are fed sequentially from the bottommost sheet instead of the topmost sheet of the set sheets.

SUMMARY

Here, an advantage of some aspects of the invention is that a sheet of media can be more reliably separated in a feeding device that feeds media from the bottommost sheet of the set media.

A medium feeding device according to a first aspect of the invention includes a medium mounting portion where media are mounted; a feeding roller that feeds the media from the medium mounting portion by contacting a bottommost sheet of the media mounted in the medium mounting portion, and rotating; a separator that separates a sheet of the media by nipping the sheet between the feeding roller and the separator; an abutting member that is switchable between a closed posture that blocks a feeding path of the media upstream of the separator and an open posture that opens the feeding path, abuts against a leading edge of at least some of the media mounted in the medium mounting portion, and includes a friction surface at a position where the abutting member abuts against the leading edge; and a biasing member that biases the abutting member toward the closed posture.

According to this aspect, the medium feeding device includes the abutting member that abuts against the leading edge of at least some of the media mounted in the medium mounting portion and that includes a friction surface at a position where the abutting member abuts against the edge. As a result, due to the effects of the friction surface, the number of sheets of the media advancing to the nipping position, that is, the separating position of the media by the feeding roller and the separator can be restricted and, a sheet of the media can be separated more reliably. The abutting member is switchable between the closed posture that blocks the feeding path of the media upstream of the separator and the open posture that opens the feeding path. As a result, the feeding of the media will not be obstructed (that is, obstruction can be suppressed). In addition, the separating capacity by the friction surface can be easily adjusted by adjusting the biasing force of the biasing member.

In the medium feeding device according to the aspect, the friction surface may be formed of a friction member provided in the abutting member.

In this case, the friction surface is formed of the friction member provided in the abutting member and, therefore, the coefficient of friction between the friction surface and the medium can be easily adjusted.

In the medium feeding device according to the aspect, the abutting member, when in the closed posture, may also serve as a stopper that stops the leading edge of the media mounted in the medium mounting portion from advancing between the feeding roller and the separator.

In this case, the abutting member, when in the closed posture, also serves as the stopper that stops the leading edge of the media mounted in the medium mounting portion from advancing between the feeding roller and the separator. As a result, costs of the device can be reduced.

In the medium feeding device according to the aspect, the friction surface may be provided at a position where a leading edge of at least the bottommost sheet to be fed does not abut against the friction surface when the abutting member is in the closed posture.

If the leading edge of the media to be fed catches on the friction surface when setting the media, the leading edge of the media may bend due to that catching, and there is a possibility that the media will not be fed properly after the feeding starts. However, according to this case, the friction surface is provided at the position where the leading edge of at least the bottommost sheet to be fed does not abut against the friction surface when the abutting member is in the closed posture. As a result, this problem can be avoided.

In the medium feeding device according to the aspect, the friction surface may be provided at a position where a leading edge of the bottommost sheet that is fed does not abut against the friction surface when the abutting member is in the open posture.

In this case, the friction surface is provided at the position where the leading edge of the bottommost sheet that is fed does not abut against the friction surface when the abutting member is in the open posture. As a result, the feeding of the media will not be obstructed by the friction surface (that is, obstruction can be suppressed).

The medium feeding device according to the aspect may further include a pressing unit and a separating unit. The pressing unit is provided retractably with respect to the feeding roller and presses the media mounted in the medium mounting portion toward the feeding roller by advancing toward the feeding roller. The separating unit is disposed opposite the pressing unit, is switchable between an advancing state of advancing into the feeding path and a retracting state of retracting from the feeding path, and, when in the state of advancing into the feeding path, supports the media mounted in the medium mounting portion so as to separate the bottommost sheet from the feeding roller. In this case, the abutting member is provided in the pressing unit; an engaging portion that engages with a tip of the abutting member is provided in the separating unit; in a state where the pressing unit retracts from the feeding roller and the separating unit advances into the feeding path, the tip of the abutting member engages with the engaging portion so as to maintain the closed posture; and in a state where the pressing unit advances toward the feeding roller and the separating unit retracts from the feeding path, the engagement of the tip of the abutting member with the engaging portion is released so as to allow the posture of the abutting member to be switchable.

In this case, the medium feeding device includes the pressing unit and the separating unit and these units are responsible for the approval or rejection of the state switching of the abutting member. As a result, device configuration can be simplified and costs can be reduced.

In the medium feeding device according to the aspect, the pressing unit may have a loosening surface which loosens a stack of the media mounted in the medium mounting portion when the pressing unit advances toward the feeding roller.

In this case, the pressing unit has the loosening surface which loosens the stack of the media mounted in the medium mounting portion when the pressing unit advances toward the feeding roller. Accordingly, the effect of separating the media by the friction surface is obtained more reliably.

An image reading apparatus according to a second aspect of the invention includes a reading section that performs reading on media; and the medium feeding device according to the first aspect of the invention that feeds the media toward the reading section.

According to the second aspect, the same benefits and effects can be obtained in the image reading apparatus similarly to the first aspect described above.

A recording apparatus according to a third aspect of the invention includes a recording section that performs recording on media; and the medium feeding device according to the first aspect of the invention that feeds the media toward the recording section.

According to the third aspect, the same benefits and effects can be obtained in the recording apparatus similarly to the first aspect described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the present invention is described with reference to the drawings, but the invention is not limited to the following embodiment and various modifications are possible within the scope recited in the claims. The following description of the embodiment is given under the presumption that such modifications are also included in the scope of the invention.

Figure 1:
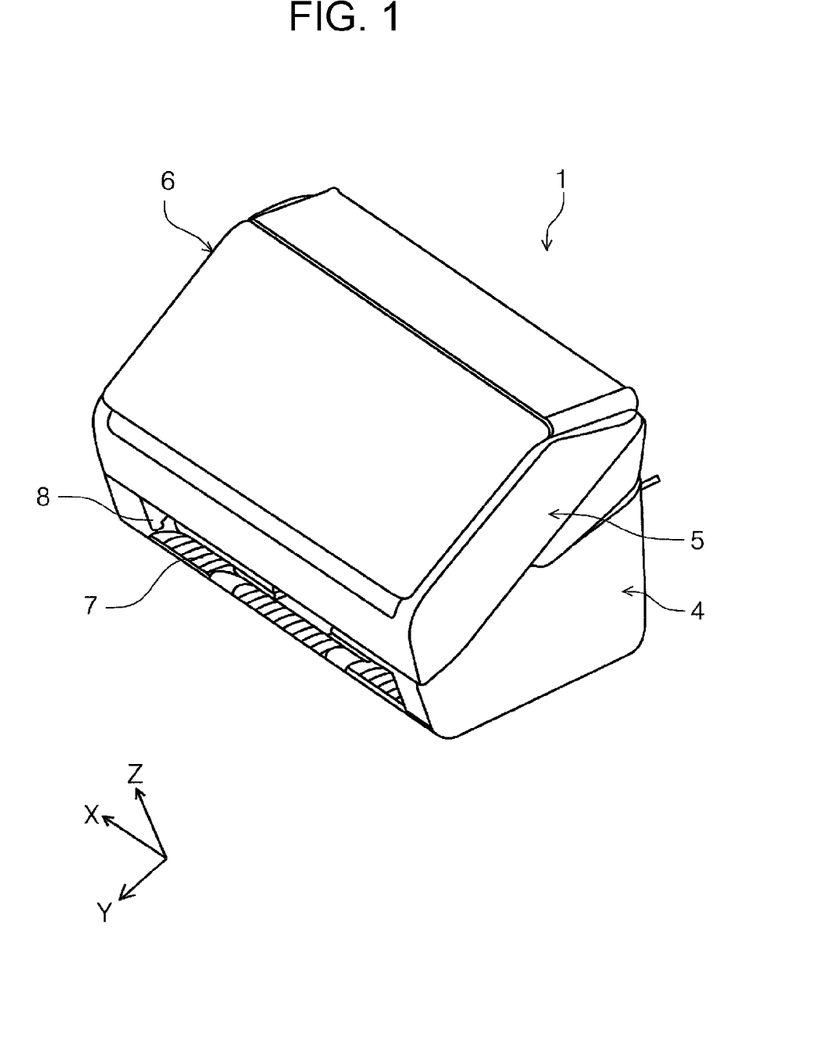
FIG. 1 is a perspective view illustrating an appearance of an image reading apparatus according to the invention.
Figure 2:
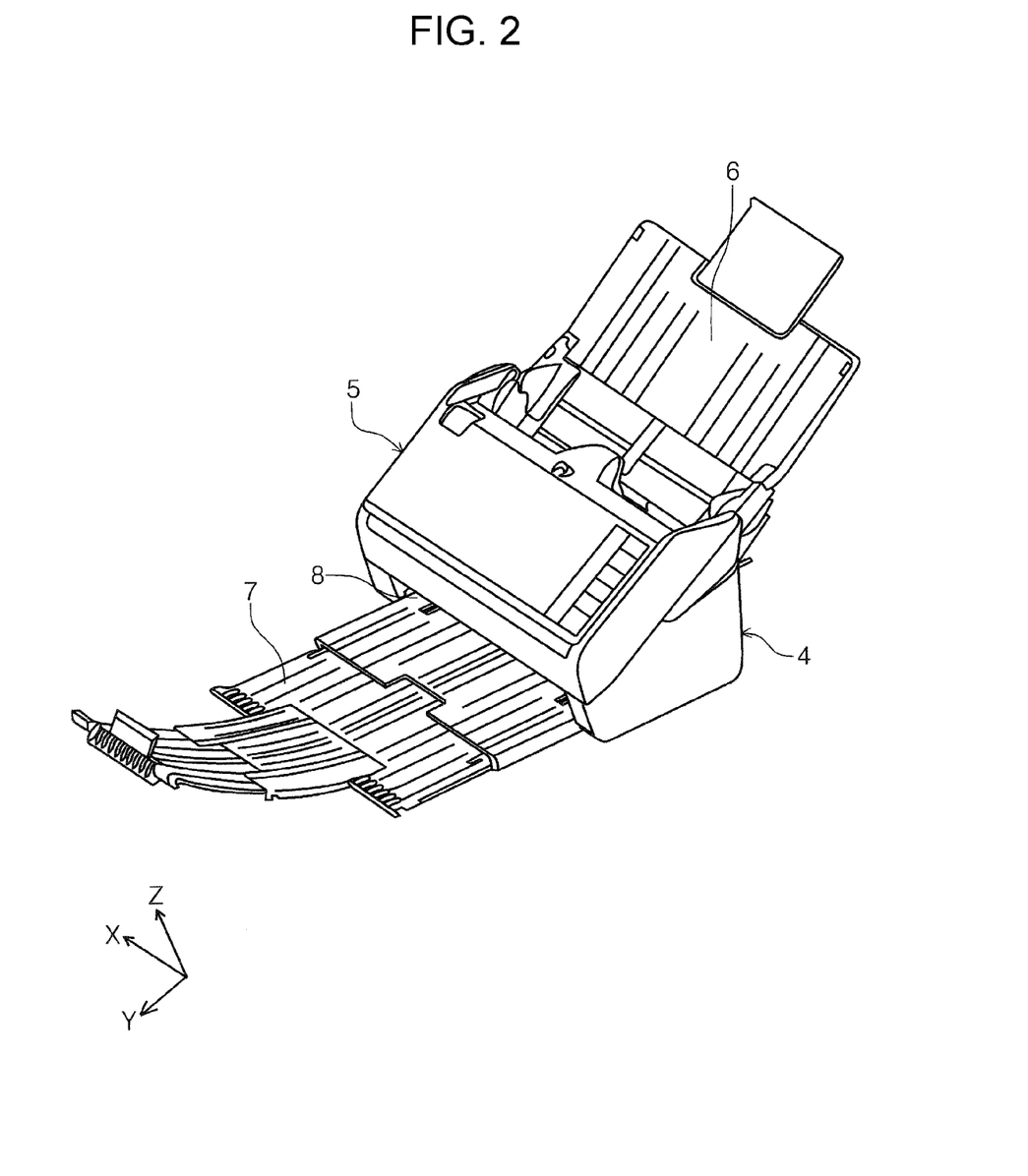
FIG. 2 is a perspective view illustrating an appearance of the image reading apparatus according to the invention, in a state where a cover is open.
Figure 3:
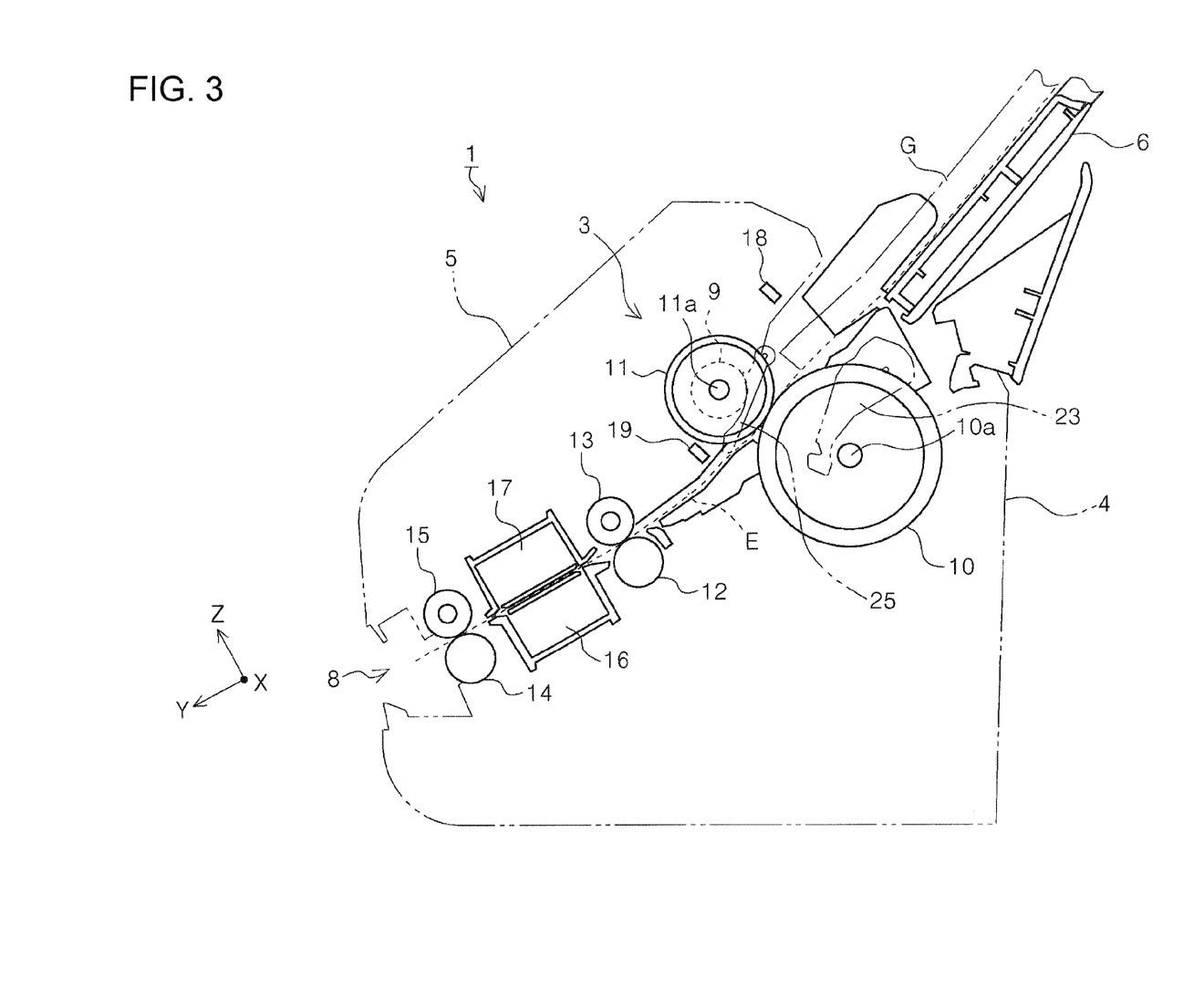
FIG. 3 is a side cross-sectional view illustrating a sheet transport path of the image reading apparatus according to the invention.
Figure 4:
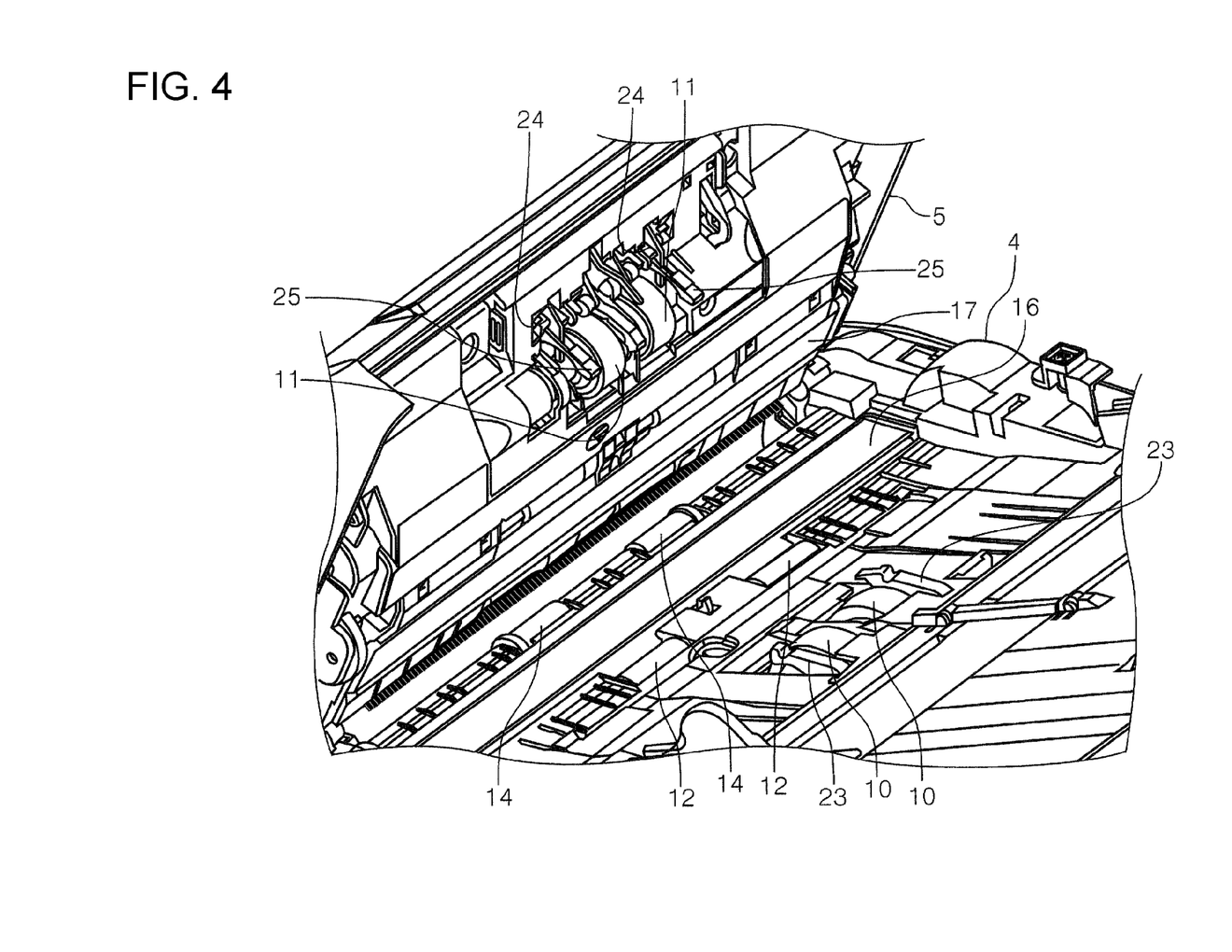
FIG. 4 is a perspective view of the image reading apparatus according to the invention, in a state where an upper unit is open.
Figure 5:
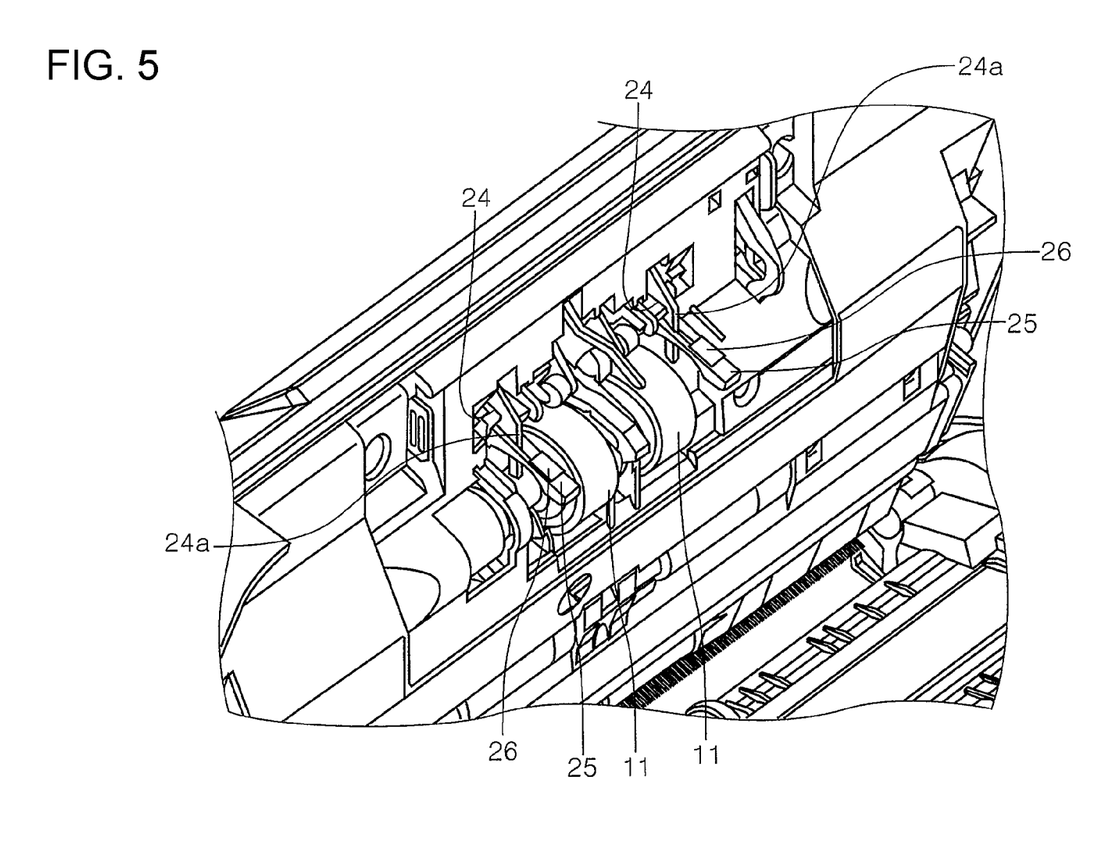
FIG. 5 is a partially enlarged perspective view of the upper unit of the image reading apparatus according to the invention.
Figure 6:
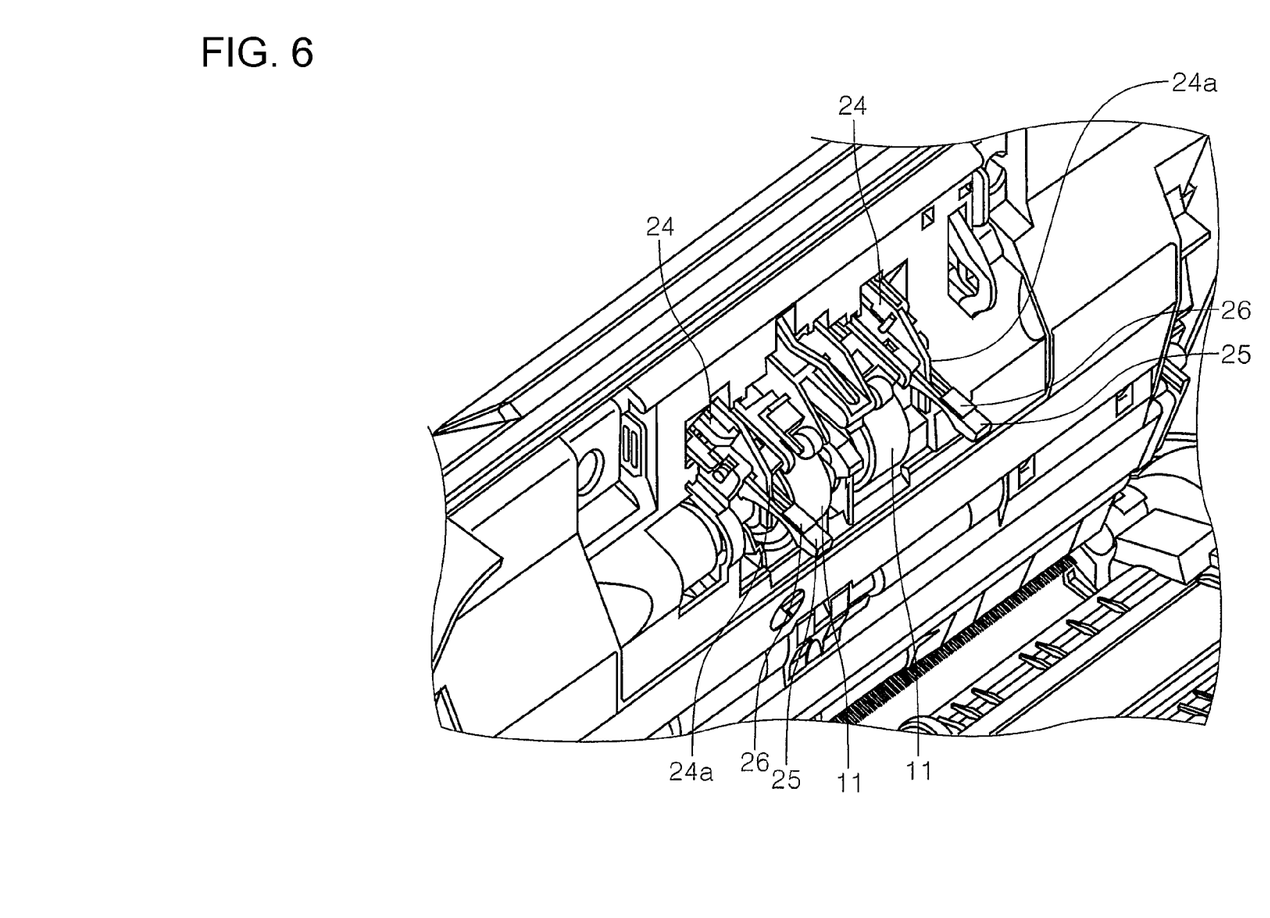
FIG. 6 is a partially enlarged perspective view of the upper unit of the image reading apparatus according to the invention.
Figure 7:
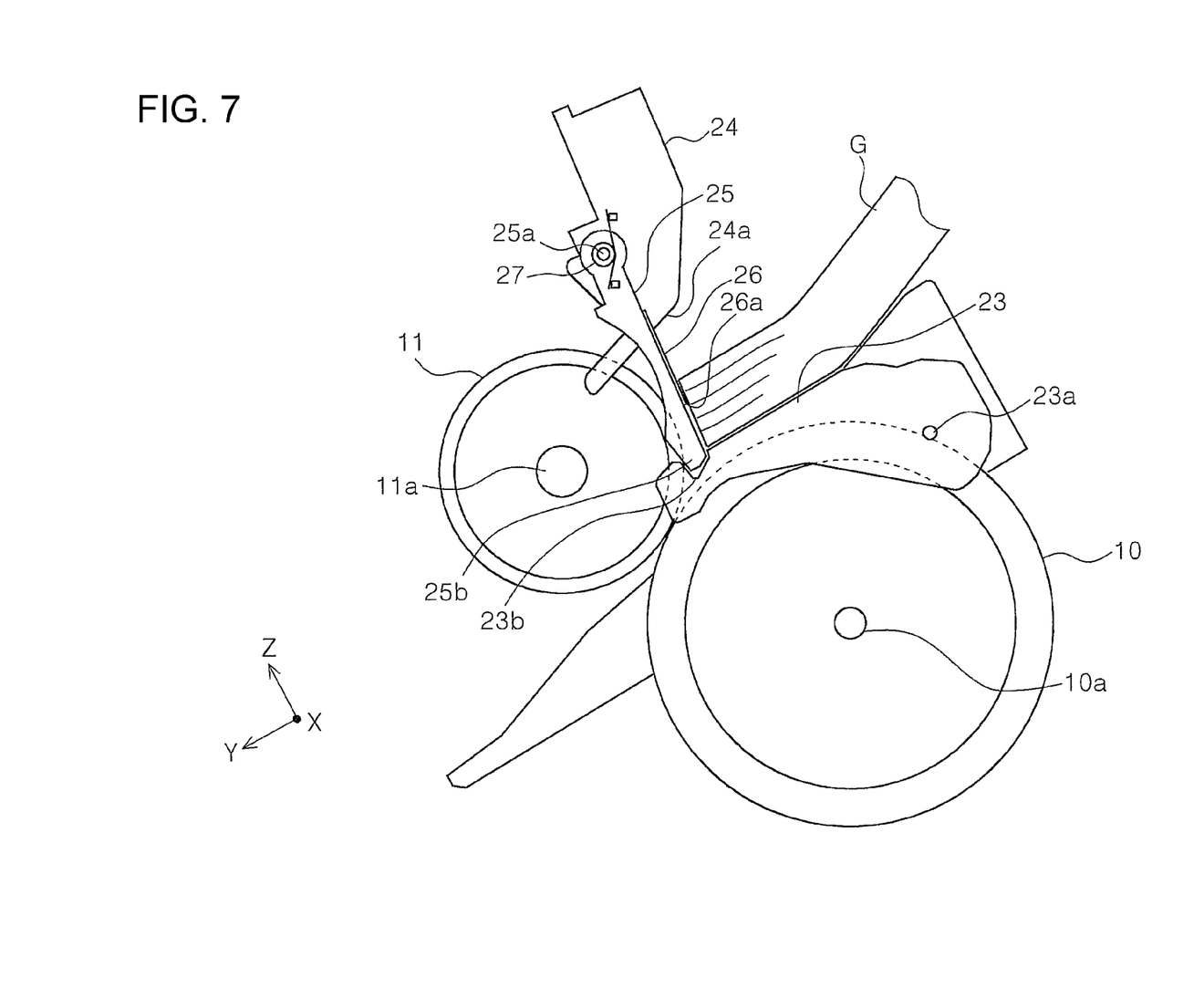
FIG. 7 is an enlarged drawing of a separator that separates sheets.
Figure 8:
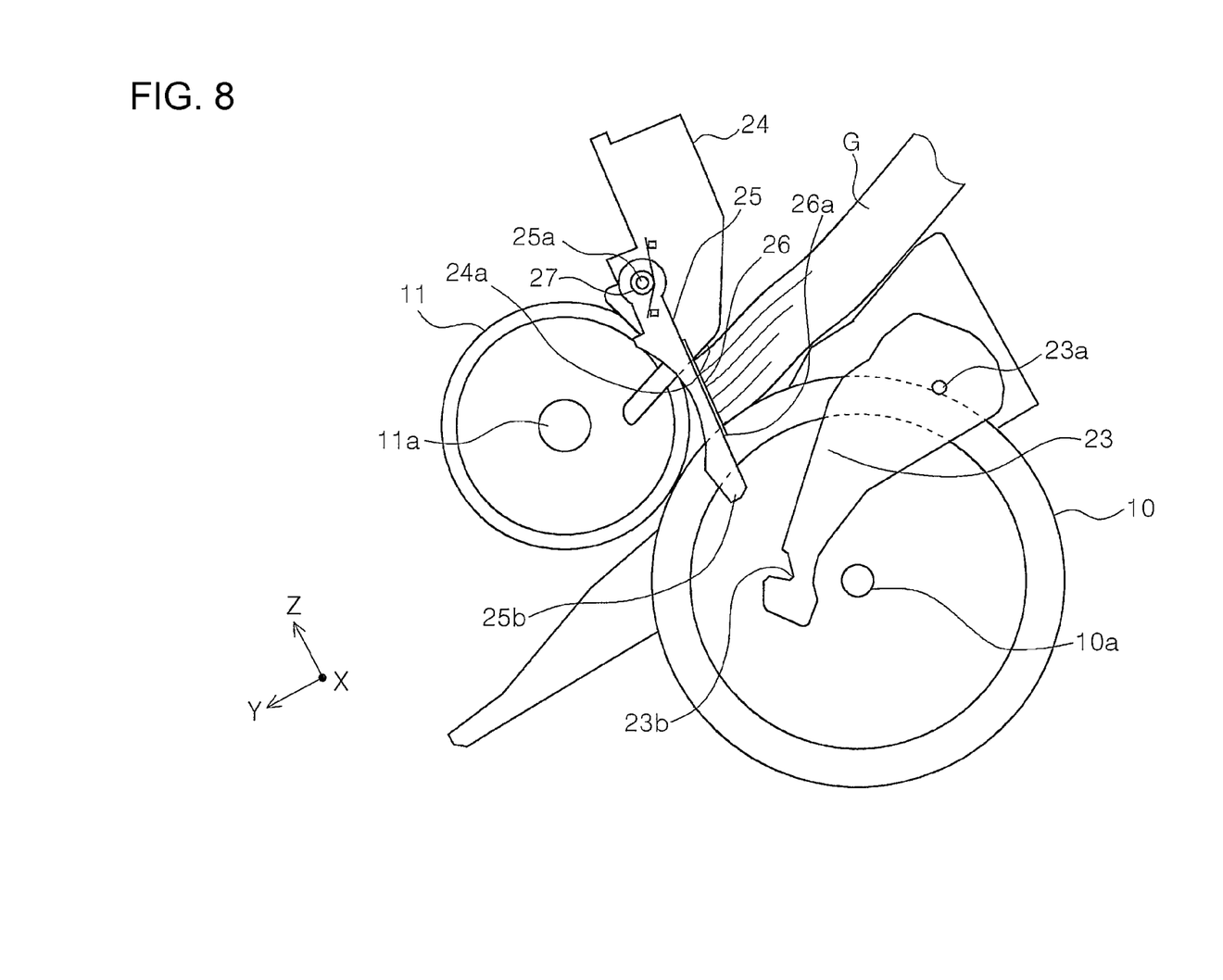
FIG. 8 is an enlarged drawing of a separator that separates sheets.
Figure 9:
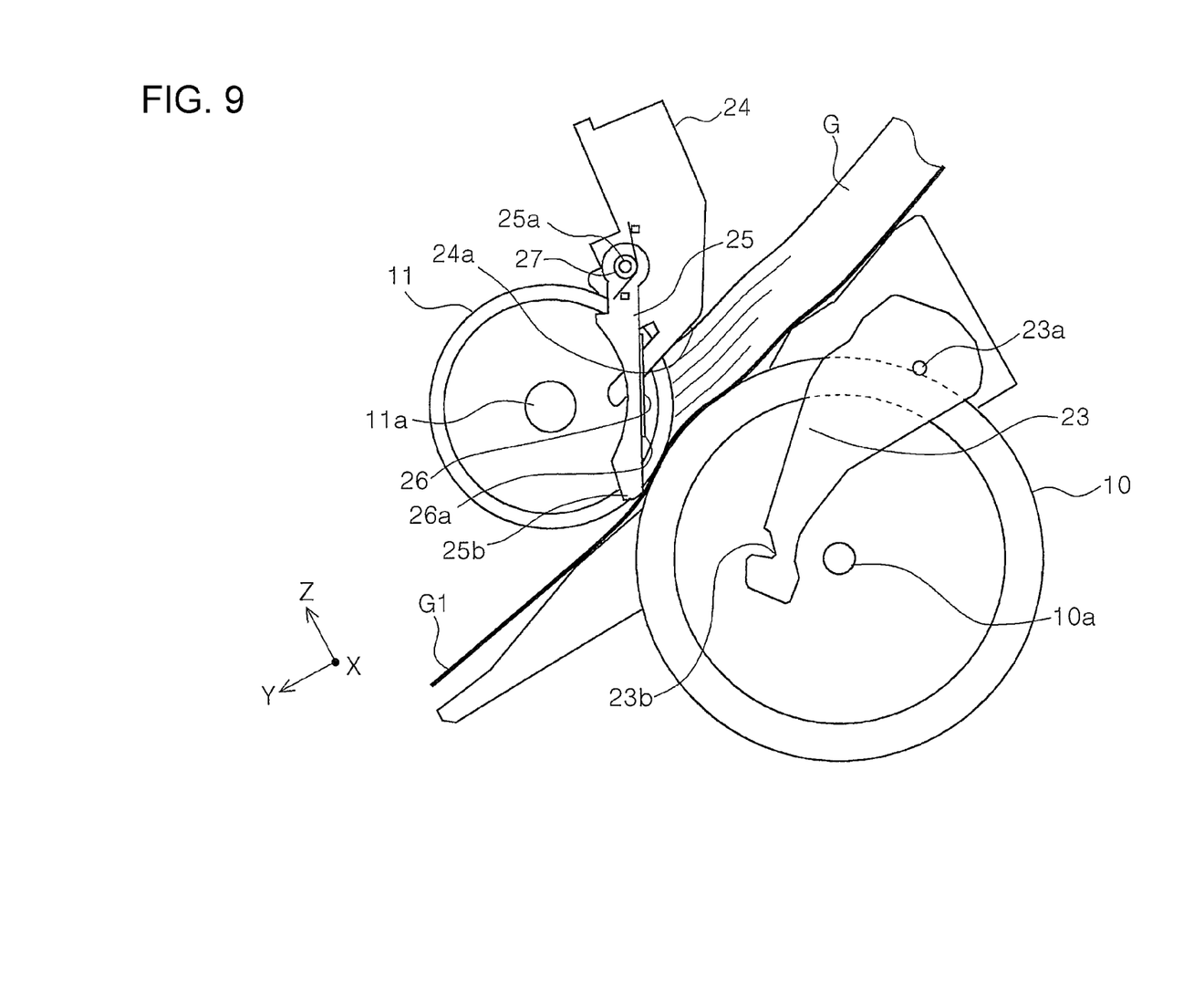
FIG. 9 is an enlarged drawing of a separator that separates sheets.

FIG. 1 is a perspective view illustrating an appearance of an image reading apparatus 1 according to the invention; FIG. 2 is a perspective view illustrating the appearance of the image reading apparatus 1, in a state where a cover 6 is open; and FIG. 3 is a side cross-sectional view illustrating a sheet transport path of the image reading apparatus 1. FIG. 4 is a perspective view of the image reading apparatus 1, in a state where an upper unit 5 is open; FIGS. 5 and 6 are partially enlarged perspective views of the upper unit 5; and FIGS. 7, 8, and 9 are enlarged drawings of a separator (the vicinity of a nip portion of a separating roller 11 and a feeding roller 10) that separates sheets.

Note that in each of the drawings, in an XYZ coordinate system, the X-direction is an apparatus width direction and a document width direction, the Y-direction is a depth direction of the image reading apparatus and a document discharging direction, and the Z-direction is a direction orthogonal to the document discharging direction. In each of the drawings, the +Y-direction side is a front face side of the apparatus and the −Y-direction side is a rear face side of the apparatus.

Hereinafter, the overall configuration of the image reading apparatus 1 according to the invention is described.

The image reading apparatus 1 is configured as a document scanner capable of reading at least one of a front side and a back side of a document to be read. The image reading apparatus 1 includes a document feeding device 3 (FIG. 3), which is an embodiment of the medium feeding device according to the invention. A main body of the image reading apparatus 1 includes a lower unit 4, an upper unit 5, a cover 6, and a discharge tray 7.

The upper unit 5 is provided rotatably with a rotary shaft (not illustrated) as the rotation fulcrum, which is provided downstream in the sheet transport direction of the lower unit 4. By rotating, the upper unit 5 can assume a closed state that forms a document transport path between the upper unit 5 and the lower unit 4 (FIGS. 1 to 3), and an open state that opens the document transport path (FIGS. 4 to 6).

The cover 6 is provided in an upper portion of a rear face side of the lower unit 4. The cover 6 is attached rotatably to the lower unit 4. By rotating, the cover 6 switches between a closed state of covering an upper portion of the upper unit 5 as illustrated in FIG. 1, and an open state of opening the upper portion of the upper unit 5 as illustrated in FIG. 2. In the open state, the cover 6 constitutes a portion of a document mounting portion (the medium mounting portion) where documents that are set are stacked.

A document discharge port 8 is provided to discharge the document that has been read to the front face side of the apparatus. The lower unit 4 includes the discharge tray 7 that can be pulled out toward the front side of the apparatus from the document discharge port 8. The discharge tray 7 can assume a state where the discharge tray 7 is stored in a bottom portion of the lower unit 4 (see FIG. 1) and a state where the discharge tray 7 is pulled out toward the front face side of the apparatus (see FIG. 2). In the present embodiment, the discharge tray 7 is formed by linking a plurality of tray members together.

Next, the image reading apparatus 1 and the sheet transport path thereof are described by referencing FIG. 3 and other drawings. Note that in the drawings including and following FIG. 3, only the main constituents of the image reading apparatus 1 and the document feeding device 3 are illustrated, and the constituents unnecessary to the description are omitted from the illustrations. In addition, in FIG. 3, only outlines of the housings of the lower unit 4 and the upper unit 5 are depicted by imaginary lines.

The bottommost document (sheet) mounted as the medium, of documents mounted on the cover 6 in the opened state, is fed downstream in a feeding direction by a feeding roller 10 that is driven to rotate by a drive source, namely a motor (not illustrated). An outer circumferential surface of the feeding roller 10 is formed of a high-friction material (e.g. rubber or similar elastomer, or the like). In the drawings, reference sign 10a denotes the axis of rotation of the feeding roller 10.

In FIG. 3, reference sign G denotes a document stack mounted (set) on the cover 6. Prior to the start of feeding, a leading edge of the document stack G is held at a feeding standby position (the position in FIG. 3) by a later described stopper 25, and is restricted from entering between the feeding roller 10 and a later described separating roller 11, which is provided as a separator. The stopper 25 is provided in a later described pressing unit 24.

A separating unit 23 is provided around the feeding roller 10. Prior to the start of feeding, the document stack G is supported from below by the separating unit 23 and, as a result is pressed up and separated from the feeding roller 10. In other words, the separating unit 23 prevents contact between the document stack G and the feeding roller 10.

When the feeding of the documents begins, the separating unit 23 retracts downward so that the bottommost document of the document stack G contacts the feeding roller 10, and the stopper 25 assumes a pivotable state (a posture switchable state). Accordingly, the bottommost document is fed downstream by the rotation of the feeding roller 10. The stopper 25 is pivoted downstream by the document that was fed downstream, and assumes a posture that opens the document feeding path.

The separating roller 11 is provided at a position opposite the feeding roller 10. In the present embodiment, the separating roller 11 is provided in a state of being biased toward the feeding roller 10 by a biasing member (not illustrated). An outer circumferential surface of the separating roller 11 is formed of a high-friction material (e.g. rubber or similar elastomer, or the like), similarly to the feeding roller 10. In the drawings, reference sign 11a denotes the axis of rotation of the separating roller 11.

The separating roller 11 includes a torque limiter 9 and, furthermore, is configured to receive, from a torqueing section or a motor or similar drive source, driving torque via the torque limiter 9 in a direction (the counter-clockwise direction in FIG. 3) opposite the rotational direction (the clockwise direction in FIG. 3) feeding the document downstream.

When the separating roller 11 configured as described above is in a state of direct contact with the feeding roller 10, the rotational torque received from the feeding roller 10 will exceed the torque limit of the torque limiter 9 and, as a result, the separating roller 11 will be driven by the feeding roller 10 so as to rotate in the clockwise direction in FIG. 3.

When the feeding of the documents has begun and the plurality of the documents enters between the feeding roller 10 and the separating roller 11, the separating roller 11 does not receive the rotational torque from the feeding roller 10 and the rotation driven by the feeding roller 10 stops. As a result, the upper documents (the documents for which multifeeding is to be prevented) other than the bottommost document to be fed do not receive the transporting force for advancing downstream, and the leading edges of the upper documents remain in a abutted state against the separating roller 11 and do not advance downstream. Thus, multifeeding of the documents is prevented.

Note that the bottommost document to be fed directly contacts the feeding roller 10 and, thus, advances downstream due to the transporting force received from the feeding roller 10.

In FIG. 3, the dashed line indicated by the reference sign E indicates the transport path of the document that is fed.

Note that in the present embodiment, the feeding roller 10 and the separating roller 11 are provided in a center region of the document in the document width direction (the X-direction) as illustrated in FIG. 4. In the present embodiment, a feeding reference position in the document width direction (the X-direction) is the center and, regardless of the size of the document, a center portion of the documents that are fed as described above contacts the feeding roller 10 and the separating roller 11.

Moreover, in the present embodiment, a plurality of sets (more specifically, two sets) of the feeding roller 10 and the separating roller 11 are provided in the document width direction (the X-direction).

A document transporter including feed rollers 12 and 13 is provided downstream of the feeding roller 10 and the separating roller 11. The bottommost document fed by the feeding roller 10 receives feeding force from the feed rollers 12 and 13 and is transported further downstream.

As document readers, reading sensors 16 and 17 are disposed vertically and face each other, downstream of the feed rollers 12 and 13. In the present embodiment, the reading sensors 16 and 17 are configured as, for example, a contact image sensor module (CISM).

After at least one of the front side and the back side of the document is read by the reading sensors 16 and 17, the document is discharged from the document discharge port 8 by a document discharger that includes feed rollers 14 and 15 that are positioned downstream in the transport direction from the sensors.

Note that, in the present embodiment, a plurality of sets (more specifically, two sets) of the roller pair of feed rollers 12 and 13 and the roller pair of feed rollers 14 and 15 are provided in the document width direction (the X-direction).

The foregoing is a rough configuration of the image reading apparatus 1. Hereinafter, further description will be given of the configuration of the document feeding device 3, while referencing the drawings including and following FIG. 4.

As described above, the document feeding device 3 includes the pressing unit 24 and the separating unit 23.

The pressing unit 24 is provided retractably with respect to the feeding roller 10, and is biased, by a biasing member (not illustrated), in a direction advancing toward the feeding roller 10.

The separating unit 23 is provided so as to be pivotable around a pivot shaft 23a, and is switchable between an advancing state (FIG. 7) in which the separating unit 23 advances into the document feeding path (toward the pressing unit 24) and a retracting state (FIGS. 8 and 9) in which the separating unit 23 retracts from the feeding path. When in the advancing state, the separating unit 23 supports the document stack G set as described above and prevents the bottommost document from coming in contact with the feeding roller 10.

A recessed portion 23b is formed as an engaging portion in the separating unit 23 and, as illustrated in FIG. 7, when the separating unit 23 is in the advancing state, a tip 25b of the stopper 25 enters the recessed portion 23b. In this state, the pressing unit 24 resists the biasing force of the biasing member (not illustrated) and is pressed up by the separating unit 23 via the stopper 25; and, thus, the pressing unit 24 maintains the state of separation from the feeding roller 10.

The pressing unit 24 does not press the document stack G when in this feed standby state.

In addition, when in this feed standby state, the tip 25b of the stopper 25 enters the recessed portion 23b of the separating unit 23. Therefore, the rotation of the stopper 25 around the pivot shaft 25a is restricted and the closed posture that closes the document feeding path is maintained. In other words, pivoting action is restricted so that posture switching is not performed.

FIGS. 4 and 5 illustrate the advancing state where the pressing unit 24 is separated from the feeding roller 10 and the separating unit 23 is advancing into the feeding path. Conversely, FIG. 6 illustrates a state where the pressing unit 24 has advanced toward the feeding roller 10.

Note that the stopper 25 is biased toward the closed posture that closes the document feeding path by a coil spring 27 as a biasing member.

When the feeding of the documents begins, as illustrated in FIG. 8, the separating unit 23 switches from the advancing state to the retracting state, and the bottommost document comes in contact with the feeding roller 10. As a result, the state of the pressing unit 24 being pressed upward by the separating unit 23 via the stopper 25 is released and, thus, the pressing unit 24 advances toward the feeding roller 10 due to the biasing force of the biasing member (not illustrated) and presses the document stack G toward the feeding roller 10.

Then, when the feeding roller 10 rotates, the bottommost document that is in contact with the feeding roller 10 is fed downstream. The stopper 25 is switched to a posture that opens the document feeding path as illustrated in FIG. 9 by the document that was fed downstream. As described above, when in the feed standby state, the stopper 25 stops the document stack G from advancing downstream, but at a time of document feeding, does not obstruct the feeding of the document. Note that in FIG. 9, the reference sign G1 denotes the bottommost document that is fed.

In the configuration described above, a friction member (friction surface) 26 is provided on a surface of the stopper 25 facing the set document stack G. The friction member 26 is formed of cork or an elastomer such as rubber or a similar material that increases the coefficient of friction between the surface and the document. In the present embodiment, the friction member 26 is attached to the surface of the stopper 25 facing the set document stack G by using an adhesive or double-sided tape. In addition, in the present embodiment, the stopper 25 is formed of a resin material.

As illustrated in switching from the state of FIG. 8 to the state of FIG. 9, the friction member 26 contacts the leading edge of the set document stack G and performs separating at the time of document feeding. In other words, the friction member 26 performs the function of restricting the number of sheets of media advancing to a nipping position (separating position) of the media by the feeding roller 10 and the separator 11.

The following is a summary of the features of the document feeding device 3 described above. Specifically, the document feeding device 3 includes the cover 6 as the medium mounting portion where documents are mounted as media; the feeding roller 10 that feeds the documents by contacting the bottommost sheet of the documents mounted in the cover 6, and rotating; and the separating roller 11 as the separator that separates a sheet of the documents by nipping the sheet between the separating roller 11 and the feeding roller 10.

In addition, the document feeding device 3 includes the stopper 25 and the coil spring 27. The stopper 25 is an abutting member that is provided above the feeding roller 10, is switchable between the closed posture that blocks the document feeding path upstream of the separating roller 11 and the open posture that opens the document feeding path, abuts against the leading edge of the documents mounted in the cover 6, and is provided with the friction surface (the friction member 26) positioned so as to contact the leading edge. The coil spring 27 is a biasing member for biasing the stopper 25 toward the closed posture.

Accordingly, due to the effects of the friction member 26, the number of sheets of the documents advancing to the document nipping position, that is, document separating position by the feeding roller 10 and the separating roller 11 can be restricted and, as a result, the documents can be separated more reliably.

In addition, the document separating capacity by the friction member 26 (the friction surface) can be easily adjusted by adjusting the biasing force of the coil spring 27 provided as the biasing member.

In addition, the friction surface is formed of the friction member 26 as a high-friction material provided on the stopper 25 and, therefore, the coefficient of friction with the leading edge of the document can be easily adjusted.

In addition, when in the closed posture, the stopper 25 as the abutting member also serves as the stopper that stops the leading edge of the documents mounted in the cover 6 from advancing between the feeding roller 10 and the separating roller 11. As a result, costs of the device can be reduced.

In addition, as illustrated in FIG. 7, the friction member 26 is provided at the position where the leading edge of at least the bottommost document to be fed does not abut against the friction member 26 when the stopper 25 is in the closed posture. In FIG. 7, the reference sign 26a denotes a lower end of the friction member 26.

In other words, if the leading edge of the bottommost document to be fed catches on the friction surface 26 when setting the documents, the leading edge of the bottommost document may bend due to that catching, and there is a possibility that the document is not fed properly after the feeding starts. However, the friction member 26 is provided at the position where the leading edge of at least the bottommost document to be fed does not abut against the friction member 26 when the stopper 25 is in the closed posture. As a result, this problem can be avoided.

Furthermore, as illustrated in FIG. 9, the friction member 26 is provided at the position where the leading edge of the bottommost document G1 that is fed does not abut against the friction member 26 when the stopper 25 is in the open posture. As a result, the friction member 26 will not obstruct the feeding of the document G1 or, at the least, obstruction can be suppressed.

In addition, the document feeding device 3 includes the pressing unit 24 that is provided retractably with respect to the feeding roller 10, and presses the mounted documents toward the feeding roller 10 by advancing toward the feeding roller 10. Further, the document feeding device 3 includes the separating unit 23 that is disposed opposite the pressing unit 24, is switchable between an advancing state where the separating unit 23 advances into the document feeding path and a retracting state where the separating unit 23 retracts from the document feeding path, and, when in the advancing state, supports the mounted documents so as to separate the bottommost document from the feeding roller 10.

Moreover, the stopper 25 is provided in the pressing unit 24. The separating unit 23 has the recessed portion 23b as the engaging portion that engages with the tip 25b of the stopper 25. In a state where the pressing unit 24 retracts from the feeding roller 10 and the separating unit 23 advances into the document feeding path, the tip 25b of the stopper 25 enters the recessed portion 23b and, thus, the closed posture of the stopper 25 is maintained. Moreover, in a state where the pressing unit 24 advances toward the feeding roller 10 and the separating unit 23 retracts from the document feeding path, the engagement between the tip 25b of the stopper 25 and the recessed portion 23b is released so as to make the posture of the stopper 25 switchable.

The pressing unit 24 and the separating unit 23 are responsible for the approval or rejection of the state switching of the stopper 25 and, therefore, device configuration can be simplified and costs can be reduced.

Note that the pressing unit 24 has a loosening surface 24a which loosens the leading edge of the mounted document stack G when the pressing unit 24 advances toward the feeding roller 10.

The loosening surface 24a loosens the leading edge of the mounted document stack G when the pressing unit 24 advances toward the feeding roller 10 (FIG. 8). As a result, the separating effects by the friction member 26 can be more reliably obtained.

In the embodiment described above, an example was described in which the medium feeding device according to the invention was applied to the image reading apparatus 1. However, the invention is not limited thereto and the medium feeding apparatus 1 can be applied to recording apparatuses provided with a recording section that performs recording on recording media (e.g. printing paper). Examples of a recording section include ink jet recording heads, and examples of recording apparatuses includes facsimile machines, printers, and the like. Examples of the configuration of a recording apparatus include a configuration that includes an ink jet recording head substituted for the reading sensor 17 in FIG. 3, and a planten that supports paper substituted for the reading sensor 16 in FIG. 3.

In addition, the invention is not limited to the examples described above and various modifications are possible within the scope recited in the claims. Of course, such modifications are also included in the scope of the invention.

For example, in the present embodiment, the stopper 25 was provided as the abutting member in the pressing unit 24, but may be provided on another constituent (e.g. a frame, or the like). In addition, in the present embodiment, when not feeding, the stopper that restricts the leading edge of the set document stack also had the function of the abutting member, but the invention is not limited thereto and a dedicated constituent provided with the function of the abutting member may be provided.

Moreover, in the present embodiment, the friction surface provided on the abutting member was formed of the friction member 26, but may also be formed as, for example, a rough surface by resin molding.

The entire disclosure of Japanese Patent Application No. 2015-206369, filed Oct. 20, 2015 is expressly incorporated by reference herein.

What is claimed is:

1. A medium feeding device comprising:
  a medium mounting portion where media are mounted;
  a feeding roller that feeds the media from the medium mounting portion by contacting a bottommost sheet of the media mounted in the medium mounting portion, and rotating;
  a separator that separates a sheet of the media by nipping the sheet between the feeding roller and the separator;
  an abutting member that is switchable between a closed posture that blocks a feeding path of the media upstream of the separator and an open posture that opens the feeding path, abuts against a leading edge of at least some of the media mounted in the medium mounting portion, and includes a friction surface at a position where the abutting member abuts against the leading edge, wherein the friction surface does not come into contact with the lower most media nearest the feeding roller prior to feeding and when the abutting member is in the closed position; and
  a biasing member that biases the abutting member toward the closed posture,
  wherein the friction surface is formed of a friction member that restricts the number of media entering the nip position and the friction member is provided in the abutting member,
  a pressing unit that is provided retractably with respect to the feeding roller and presses the media mounted in the medium mounting portion toward the feeding roller by advancing toward the feeding roller, the pressing unit including a surface that extends towards and overlaps a portion of the separator; and
  a separating unit that is disposed opposite the pressing unit, is switchable between an advancing state of advancing into the feeding path and a retracting state of retracting from the feeding path by the operation of a motor that powers the feeding roller, and, when in the state of advancing into the feeding path, supports the media mounted in the medium mounting portion so as to separate the bottom most sheet from the feeding roller,
  wherein:
  the abutting member is provided in the pressing unit,
  an engaging portion that engages with a tip of the abutting member is provided in the separating unit,
  in a state where the pressing unit retracts from the feeding roller and the separating unit advances into the feeding path, the tip of the abutting member engages with the engaging portion so as to maintain the closed posture, and in a state where the pressing unit advances toward the feeding roller and the separating unit retracts from the feeding path, the engagement of the tip of the abutting member with the engaging portion is released so as to allow the posture of the abutting member to be switchable.

2. The medium feeding device according to claim 1, wherein the abutting member, when in the closed posture, also serves as a stopper that stops the leading edge of the media mounted in the medium mounting portion from advancing between the feeding roller and the separator.

3. An image reading apparatus comprising:
a reading section that performs reading on media and
the medium feeding device according to claim 2 that feeds the media toward the reading section.

4. A recording apparatus comprising:
a recording section that performs recording on media and
the medium feeding device according to claim 2 that feeds the media toward the recording section.

5. The medium feeding device according to claim 1, wherein the friction surface is provided at a position where a leading edge of the bottommost sheet that is fed does not abut against the friction surface when the abutting member is in the open posture.

6. An image reading apparatus comprising:
a reading section that performs reading on media and
the medium feeding device according to claim 5 that feeds the media toward the reading section.

7. A recording apparatus comprising:
a recording section that performs recording on media and
the medium feeding device according to claim 5 that feeds the media toward the recording section.

8. The medium feeding device according to claim 1, wherein the pressing unit has a loosening surface which loosens a stack of the media mounted in the medium mounting portion when the pressing unit advances toward the feeding roller.

9. An image reading apparatus comprising:
a reading section that performs reading on media and
the medium feeding device according to claim 8 that feeds the media toward the reading section.

10. An image reading apparatus comprising:
a reading section that performs reading on media and
the medium feeding device according to claim 1 that feeds the media toward the reading section.

11. A recording apparatus comprising:
a recording section that performs recording on media and
the medium feeding device according to claim 1 that feeds the media toward the recording section.

12. A medium feeding device comprising:
a medium mounting portion where media are mounted, wherein the medium mounting portion is a cover member for a body of an apparatus that includes the medium feeding device;
a feeding roller that feeds the media from the medium mounting portion by contacting a bottom most sheet of the media mounted in the medium mounting portion, and rotating;
a separator that separates a sheet of the media by nipping the sheet between the feeding roller and the separator;
an abutting member that is switchable between a closed posture that blocks a feeding path of the media upstream of the separator and an open posture that opens the feeding path, abuts against a leading edge of at least some of the media mounted in the medium mounting portion, and includes a friction surface at a position where the abutting member abuts against the leading edge, wherein the friction surface does not come into contact with the lower most media nearest the feeding roller prior to feeding and while the abutting member is in the closed position; and
a biasing member that biases the abutting member toward the closed posture,
wherein the friction surface is formed of a friction member that restricts the number of media entering the nip position and the friction member is provided in the abutting member.

13. The medium feeding device according to claim 12, wherein the abutting member, when in the closed posture, also serves as a stopper that stops the leading edge of the media mounted in the medium mounting portion from advancing between the feeding roller and the separator.

14. A medium feeding device comprising:
a medium mounting portion where media are mounted,
a feeding roller that feeds the media from the medium mounting portion by contacting a bottom most sheet of the media mounted in the medium mounting portion, and rotating;
a separator that separates a sheet of the media by nipping the sheet between the feeding roller and the separator;
an abutting member that is switchable between a closed posture that blocks a feeding path of the media upstream of the separator and an open posture that opens the feeding path, abuts against a leading edge of at least some of the media mounted in the medium mounting portion, and includes a friction surface at a position where the abutting member abuts against the leading edge, wherein the friction surface does not come into contact with the lower most media nearest the feeding roller prior to feeding and while the abutting member is in the closed position; and
a biasing member that biases the abutting member toward the closed posture,
wherein the friction surface is formed of a friction member that restricts the number of media entering the nip position and that comprises one of a cork or an elastomer that increases a coefficient of friction between the friction surface and the leading edge and the friction member is provided in the abutting member.

15. The medium feeding device according to claim 14, wherein the abutting member, when in the closed posture, also serves as a stopper that stops the leading edge of the media mounted in the medium mounting portion from advancing between the feeding roller and the separator.

* * * * *